United States Patent [19]

DeRees

[11] Patent Number: 4,884,843
[45] Date of Patent: Dec. 5, 1989

[54] SEAT TILT MECHANISM

[75] Inventor: Delbert D. DeRees, Romeo, Mich.

[73] Assignee: Chrysler Motors Corporation, Highland Park, Mich.

[21] Appl. No.: 341,382

[22] Filed: Apr. 21, 1989

[51] Int. Cl.$^4$ ............................................. B60N 1/02
[52] U.S. Cl. .................................... 297/331; 297/336
[58] Field of Search ............... 297/331, 334, 335, 336, 297/14

[56] References Cited

U.S. PATENT DOCUMENTS

| | | | |
|---|---|---|---|
| 1,137,172 | 4/1915 | Stewart | 108/48 |
| 3,880,464 | 4/1975 | Murphy et al. | 297/331 |
| 4,636,003 | 1/1987 | Siebler | 297/336 |

FOREIGN PATENT DOCUMENTS 243121 11/1926 United Kingdom .................. 297/14

Primary Examiner—Francis K. Zugel
Attorney, Agent, or Firm—Gary A. Newtson

[57] ABSTRACT

A seat tilt mechanism includes a seat frame pivotally secured at its forward end to a floor mounted support. A first toggle link is pivotally secured at a pivot axis eccentrically displaced from the tilt axis for the seat and is in turn pivotally secured to a second link whose other end is pivotally secured to the rear of the seat frame about a support axis. An actuator is pivotally secured for rotation about the support axis together with the second link and preferably, the second toggle link is formed as a portion of the actuator. Moreover, the actuator forms a support leg for supporting the rear end of the seat in the seating position. A latch mechanism retains the seat in its seating position. The latch mechanism is supported by a latch housing which rotates in unison with the support leg so that both members are retracted beneath the seat as the seat is pivoted from its seating position to an access position which permits access to an area behind the seat. Preferably, the seat is retained in its access position by an over-center toggle relationship between the first and second toggle links.

2 Claims, 3 Drawing Sheets

SEAT TILT MECHANISM

BACKGROUND OF THE INVENTION

I. Field of the Present Invention

The present invention relates generally to a seat and, in particular, to vehicle seats which can be tilted forwardly to provide access to an area rearwardly of the seat.

II. Description of The Prior Art

Tiltable seats are previously known for providing access to a rear seating or storage space in motor vehicles. The seat tilts forwardly about a substantially horizontal axis to a first access position and pivots rearwardly to a seating position in which the seat can be occupied by a passenger. However, some previously known seats include complex adjustment mechanisms or rigid support structures which interfere with access to the rear area behind the vehicle seat. In addition, the tilt mechanism can substantially increase the weight of the seat structure and affect the weight distribution of the seat as it is pivoted from the seating position to the access position. Moreover, adjustment of the seating position, i.e., forward and rearward movement of the seat by means of known seat adjustment mechanisms, can interfere with the ability of the seat to maintain its access position during loading and unloading of the area to the rear of the seat.

One previously known means for assuring that the weight of the seat is maintained forwardly of the pivot axis so that the seat retains its access position comprises a release mechanism which forces the seat to a forwardmost position with respect to the seat support simultaneously with tilting of the seat. Such a structure is disadvantageous for the reason that the seat must again be readjusted once the seat has been returned to the seating position.

U.S. Pat. No. 3,880,464 to Murphy et al discloses a seat tilt mechanism in which an overcenter linkage provides toggle action to retain the seat in the access or stowed position. However, the linkage is positioned adjacent the front pivot. As a result, an operator's access to the pivot structure in order to overcome the over-center positioning of the link members is obstructed by the rearward portion of the seat and the seat support structure. In addition, the rear supports for the seat remain exposed to the access area and can interfere with the loading or unloading of passengers or freight into the rear area.

U.S. Pat. No. 4,408,798 to Mizushima et al discloses a vehicle seat structure having front legs secured to the seat frame and pivotally secured to the floor structure, while rear legs secured to the seat rest upon the floor panel. An actuator pivots the rear legs beneath the seat in response to inclination of the seat about the pivot. However, the inclining motion of the front seat is stopped by abutment of the seat back against the vehicle roof, and the seat support does not include any mechanical linkage for retaining the seat in its inclined position. Moreover, like the previously known structure disclosed in U.S. Pat. No. 3,880,464, the rear of the seat must be manually lifted to tilt the seat to its access position and does not include any mechanical linkage for reducing the effort required to lift the vehicle seat and its support mechanism.

SUMMARY OF THE PRESENT INVENTION

The present invention overcomes the abovementioned disadvantages by providing a seat tilt mechanism with a toggle incorporating a seat support structure as an actuator for the tilt mechanism. The toggle provides a mechanical advantage for retaining the seat in its access position. The toggle also cooperates with a spring to provide an operator assist for tilting of the seat. Moreover, a portion of the toggle serves as a rear support for the seat, and the rear support retracts as the seat is tilted toward the access position.

In general, a seat frame is pivotally secured to a pedestal or other support mounted to a support surface such as a vehicle floor. The tilt axis pivot is secured at a front portion of the seat frame and forms a first pivot in the toggle linkage. A second pivot couples an end of a first toggle link to the seat support at a position eccentrically offset from the tilt axis near the front of the seat frame. Another end of the first link is pivotally secured to a second link whose other end is pivotally secured to the rear of the seat frame about a support axis. An actuator member, preferably in the form of a support leg for the seat, is secured for rotation about the support axis together with the second link of the toggle. Preferably, a portion of the support leg forms the second toggle link.

In the preferred embodiment, the seat frame supports a seat adjustment mechanism, and the toggle provides the advantage that, regardless of the position of the seat with respect to the frame, the toggle retains the seat in the access position while permitting the seat to return to the same adjusted position once the seat is tilted rearwardly towards the seating position. Moreover, a biasing spring extending across the toggle provides compensation for tilting the seat from the seating position to the access position. Preferably, the toggle is an over-center toggle mechanism to avoid the need for a separate latching mechanism which locks the toggle links in a fixed, extended position supporting the seat in its inclined access position. Nevertheless, other means for locking the toggle links in an extended position are also contemplated as useful. However, with the preferred embodiment, a simple handle, preferably in the form of a flexible strap, can be secured at the free end of the rear support leg to ease actuation of the tilt mechanism from both the seating position and the access position. A releasable latch securely retains the seat in the seating position.

BRIEF DESCRIPTION OF THE DRAWING

The present invention will be more clearly understood by reference to the following detailed description when read in conjunction with the accompanying drawing in which like reference characters refer to like parts throughout the views and in which.

DETAILED DESCRIPTION OF A PREFERRED EMBODIMENT OF THE PRESENT INVENTION

Figure 1:
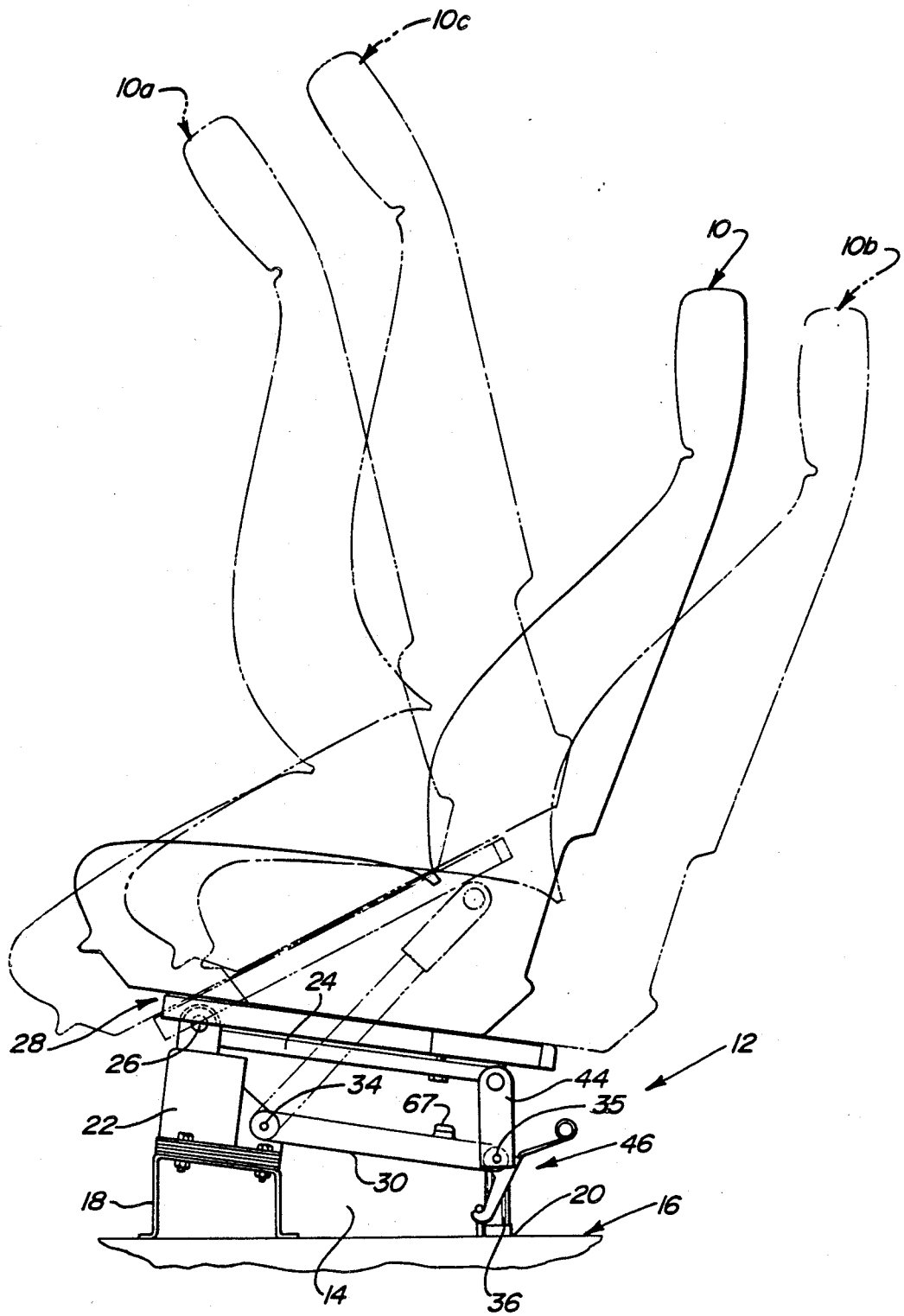
FIG. 1 is a side view of a vehicle mounted seat with a tilt mechanism constructed in accordance with the present

Referring first to FIG. 1, the seat 10 is mounted by a seat supporting tilt mechanism 12 within the vehicle passenger compartment 14. The flooring structure 16 can be constructed in any desired manner to form a rigid support for the interior components and occupants of the vehicle but, in the preferred embodiment, includes support stanchions 18 for ease in mounting the seat supporting tilt mechanism 12 within the passenger compartment 14. The flooring structure 16 can also include trim layers, which improve the appearance or insulating ability of a flooring structure, as shown at 20 in FIG. 1 representing padding, carpeting or the like.

The seat supporting tilt mechanism 12 includes a pedestal 22 having a pivot connection with the front end of a support member 24. The support member 24 pivots about a substantially horizonal tilt axis 26 extending through pivot pin 27 so as to rotate and raise the seat from the seating position shown in solid line in FIG. 1 to the inclined access position shown in phantom line at 10A in FIG. 1. In addition, the support member 24 supports a slide assembly mechanism 28 which provides a means for adjusting the position of the seat forwardly and rearwardly with respect to the flooring structure 16 as diagrammatically represented in phantom line at 10B in FIG. 1.

Figure 2:
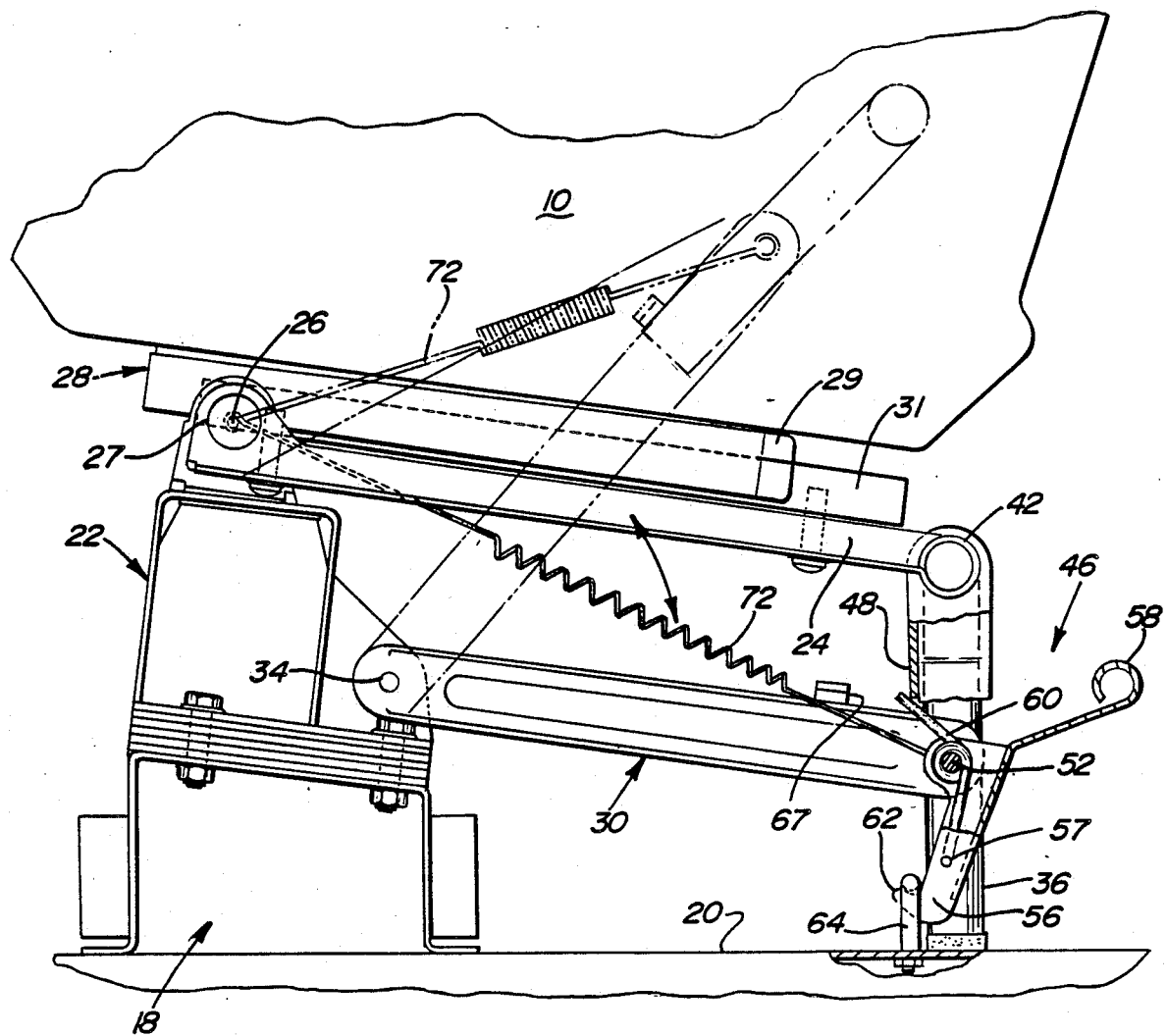
FIG. 2 is an enlarged side view of the tilt mechanism shown in FIG. 1 with portions broken away for the sake of clarity.

As best shown in FIG. 2, the slide mechanism 28 includes upper and lower rails 29 and 31, respectively, which operate independently of the pivotal connection between the support member 24 and the pedestal 22. As a result, the seat adjuster 28 maintains the position of the seat 10 with respect to the support member 24 regardless of whether the seat is lowered at its seating position as designated in phantom line at 10B or in its inclined access position as shown in phantom line at 10C.

Figure 3:
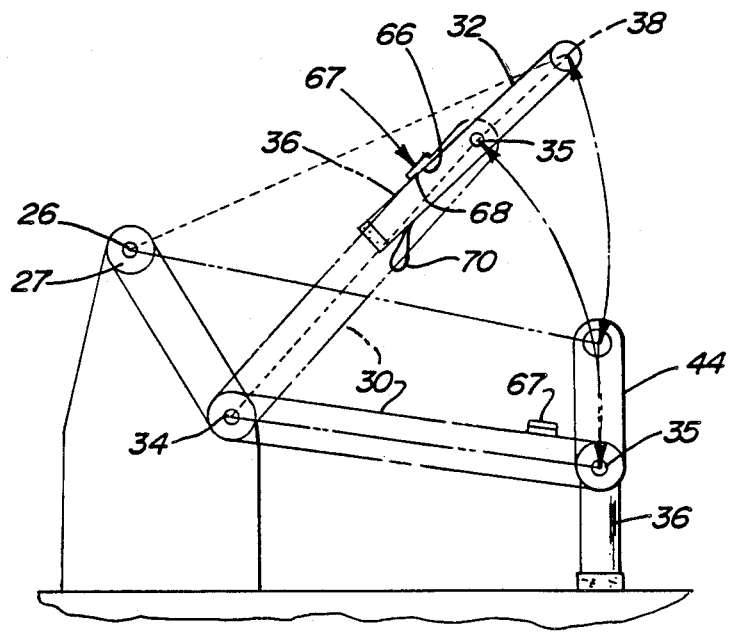
FIG. 3 is a diagrammatic view of the toggle operation used in the present invention.
Figure 4:
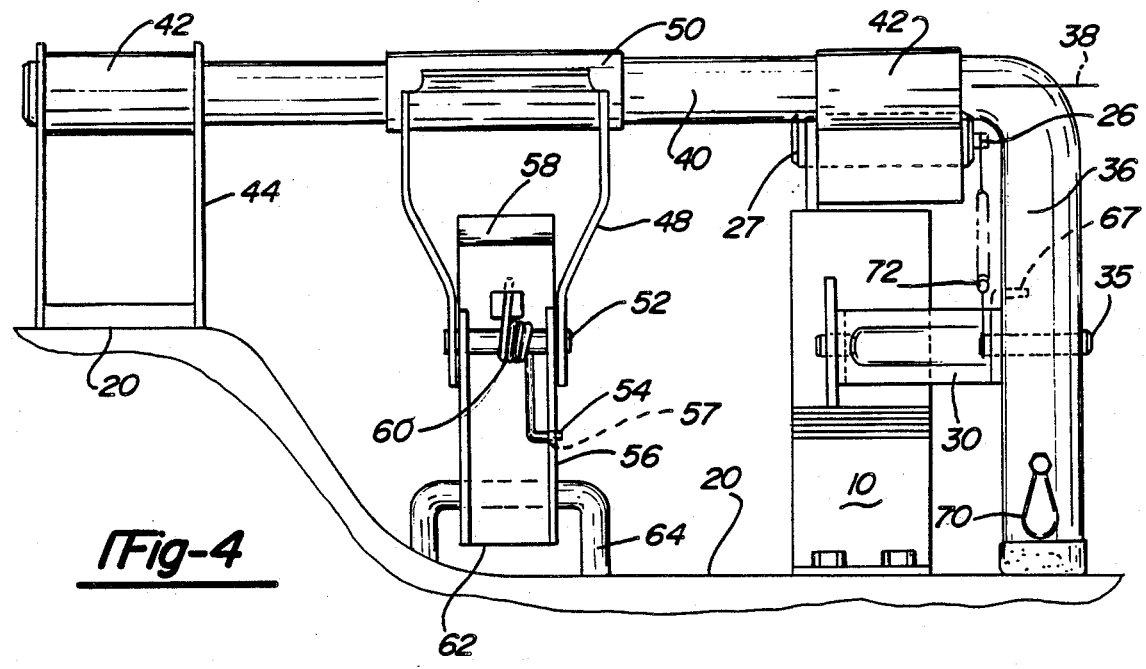
FIG. 4 is a rear view of the tilt mechanism with portions broken away for the sake of clarity.
Figure 5:
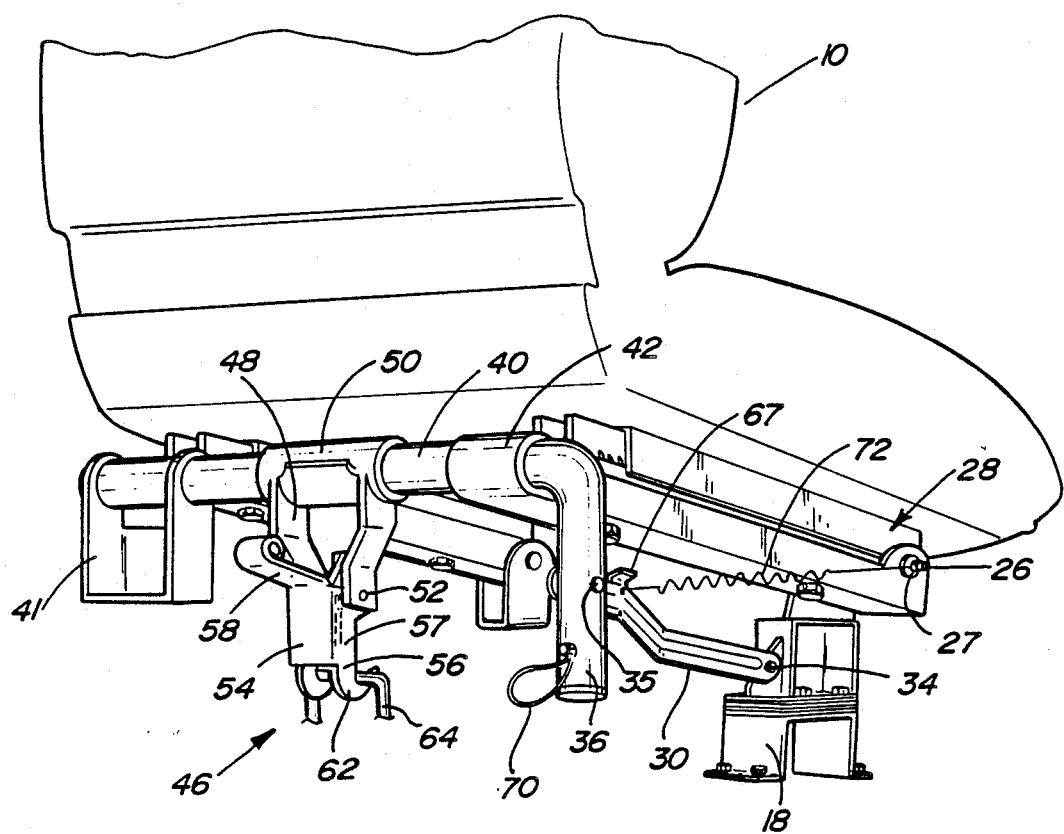
FIG. 5 is a rear perspective view of the mechanism shown in FIGS. 1-4.

As also shown in FIGS. 1 and 2, a first toggle link 30 is pivotally secured by a pivot pin 34 to the pedestal 22 at a position eccentrically spaced rearwardly from and below the tilt axis 26. The other end of the toggle link 30 is pivotally secured to a support leg 36 by a pivot pin 35 (FIGS. 3 and 4). The upper end of the support leg 36 is pivotally secured to the support member 24 near the rear of the support member at pivot axis 38.

As best shown in FIG. 4, the pivot about the support axis 38 is formed by an elongated rod 40 rotatably journalled in spaced sleeves 42 secured to the support member 24. The support leg 36 is secured at one end of the rod 40 and, in the preferred embodiment as shown in FIG. 4, can be formed in one piece with the rod 40. A leg 44 formed from a C-channel member is secured to the other end of the rod 40 for rotation therewith. Thus, the legs 36 and 44 pivot in unison so as to engage registering portions of the flooring surface 20 when the seat is moved to the seating position. A sole plate 45 at the bottom of the leg 44 expands the surface area engaged by the leg. A handle 70 in the form of a flexible strap formed in a loop is bolted at the lower end of leg 36.

The seat 10 is retained in the seating position by a latch mechanism 46. As shown in FIGS. 2 and 4, the latch mechanism 46 includes a latch housing 48 formed by a C-channel member securely fastened to a sleeve 50. The support sleeve 50 is secured for rotation with the rod 40. A pivot pin 52 is retained across the channel of the housing 48 extending across the side walls of the housing 48. A latch member 54 is pivotally supported on the pin 52 through a pair of apertures extending through side walls of a latch member portion 56. A coil spring 60 wrapped around the pin 52 has one end resiliently engaging the end wall of the latch housing 48, while the other end of the coil spring is engaged in an opening in the latch member portion 56 of the latch member 54. As a result, the hook 62 at the lower end of the latch member 54 is urged forwardly beneath the latch ring 64 mounted on the floor of the vehicle. A latch member handle 58 extends upwardly beyond the pin 52 so that the latch member 54 can be pivoted against the resilient force of the spring 60 to retract the hook 62 from beneath the latch ring 64.

As also shown in FIG. 2, a spring 72 can be extended across the toggle mechanism of the support 12. In the preferred embodiment, the ends of the spring are secured at the pivot pins 27 and 35. Consequently, as shown in FIG. 3, the resiliency of the spring 72 serves as a counterbalance to the weight of the seat 10 as it is lifted to the access position. In addition, the links 30 and 32 are urged toward an over-center toggle relationship. The over-center is restricted at a position at which a land 68 associated with the link 32, for example, an edge of the leg 36 rests against a land 66 (FIG. 3) associated with the link 30, for example, a stop member 67.

Having thus described the important structural features of the present invention, the operation of the apparatus is easily described. When the latch hook 62 has been released from beneath the latch ring 64 by pivoting of the latch handle 58, the seat 10 is released for movement from its seating position indicated at 10 and 10B in FIG. 1 to its inclined position shown at 10A and 10C in FIG. 1.

Actuation of the tilt mechanism 12 from the seating position toward the access position can be accomplished by grasping the lower end of the leg 36 and pulling it ward the front of the seat. Since the lower portion of the leg 36 is an extension of the second toggle link 32 extending from the pivot pin 35 to the support axis 38, the leg 36 also serves as a release mechanism for breaking the over-center toggle link relationship shown in solid line in FIG. 3. For ease in grasping and controlling movement of the seat, as well as breaking the over-center toggle relationship at the access position, the looped flexible strap 70 can easily receive one or more fingers of the person operating the tilt mechanism.

As the support member 24 pivots from the seating position about the tilt axis 26 extending through the pivot in 27, the first toggle link 30 and the second toggle link 32 formed by a portion of the leg 36 become aligned at the position shown at solid line in FIG. 3. The pivot pin 35 at the connected ends of the links 30 and 32 becomes aligned with the pivot pin 34 at the other end of the first link and the support axis 38 at the other end of link 32. As the ends of the links 30 and 32 at pivot pin 35 pass a straight line, 180° alignment with the pivot pin 34 and support axis 38 (FIG. 3), lands 66 and 68 formed on the toggle links 30 and 32, respectively, engage so as to form abutment surfaces which maintain an overcenter relationship so as to lock the seat in its inclined access position.

At the same time, it will be understood that the latch mechanism 46 and the leg members 44 and 36 rotate in unison as the seat is positioned to or from the seating and access positions. Moreover, the rotation of these members as the seat 10 is moved to the access position retracts these members beneath the seat as shown in FIGS. 1 and 2 so as to reduce obstructions to access to the area rearwardly of the seat 10. Nevertheless, the seat tilt mechanism returns these members to their operative position for latching and supporting the seat when the seat 10 returns to the seating position.

When the over-toggle relationship of the tilt mechanism has been overcome by pulling on the handle 70, the seat can be pivoted about the tilt axis 26 so that the seat returns to its seating position. During such pivotal movement, the legs 44 and 36 become positioned for engagement upon the flooring surface 20. In addition, an inclined surface 63 at the lower end of the hook 62 forces the latch member 54 to retract against the force of the coil spring 60 as it slides against the top of the latch ring 64. However, once the hook passes the top of the latch ring 64, the hook 62 becomes engaged beneath the latch ring 64 to secure the seat 10 in the seating position.

Having thus described the present invention, many modifications thereto will become apparent to those skilled in the art to which it pertains without departing from the scope and spirit of the present invention as defined in the appended claims.

What is claimed is:

1. In combination with a vehicle seat supported on a vehicle flooring structure and having a support member pivotally secured to a support for movement of the rear of said seat about a substantially horizontal tilt axis at the front of said seat to and between a first position at which the rear of the seat is raised to an access position and a second position at which the rear of the seat is lowered to a seating position, the improvement comprising:

a toggle having a first link, a second link pivotally secured at a first end to a first end of said first link, a second end of said first link being pivotally secured to a support eccentric from said tilt axis, a second end of said second link being pivotally secured to the support member about a support axis positioned rearwardly of said tilt axis, wherein said first position is defined by said first and second ends of said first and second links being substantially linearly aligned;

means for fixedly positioning said first and second links to retain said seat in said second position; and a leg structure pivotally secured at the rear of said seat about said support axis, the leg structure including a leg the upper portion of which defines the second link, the entire leg structure rotating with the second link to a position engaging the vehicle flooring structure when the seat is lowered to a seating position and rotating to a position generally aligned with the toggle when the seat is raised to an access position.

2. Invention as defined in claim 1 wherein a handle is provided on the lower portion of said leg to facilitate manual return of the vehicle seat from the access position to the seating position.

* * * * *